United States Patent [19]

Zyduck

[11] Patent Number: 4,599,029
[45] Date of Patent: Jul. 8, 1986

[54] SILAGE-TUNNELING APPARATUS

[75] Inventor: Ronald L. Zyduck, Mosinee, Wis.

[73] Assignee: Acorn Equipment Corp., Stevens Point, Wis.

[21] Appl. No.: 709,833

[22] Filed: Mar. 8, 1985

Related U.S. Application Data

[63] Continuation of Ser. No. 421,747, Sep. 23, 1982, abandoned.

[51] Int. Cl.$^4$ ............................................. B65G 65/00
[52] U.S. Cl. .................................... 414/297; 222/626; 241/101.7; 241/195; 414/324
[58] Field of Search ............... 414/297, 298, 324, 518; 222/618, 623, 626, 627, 410; 241/101.7, 193, 195, 196; 299/39, 71, 82-84

[56] References Cited

U.S. PATENT DOCUMENTS

| | | | |
|---|---|---|---|
| 2,938,326 | 5/1960 | Lundell | 241/193 X |
| 3,063,585 | 11/1962 | Bruecker | 414/297 X |
| 3,724,901 | 4/1973 | Rollins | 299/84 |
| 4,065,062 | 12/1977 | Heslop | 241/101.7 |
| 4,444,338 | 4/1984 | Reimbert | 414/324 X |

FOREIGN PATENT DOCUMENTS 872541 2/1942 France ............................... 241/196

Primary Examiner—Joseph E. Valenza
Assistant Examiner—David A. Bucci
Attorney, Agent, or Firm—Quarles & Brady

[57] ABSTRACT

A silage-tunneling apparatus (1) including a skid (2) on which is mounted an electric motor (30) arranged to drive a drive shaft (44) that has its axis arranged horizontally. Inner and outer hinged rigid cutter arms (45) are attached to the drive shaft and flexible chain cutter arms (60) are attached to the drive shaft between the hinged rigid cutter arms. Silage cutting elements (54, 63) are attached to the outer ends of the cutter arms. The apparatus forms a vertical tunnel (71) in silage (72) stored in a silo (70) upon being moved upwardly along the inside surface of the wall of the silo, the tunnel providing an opening for the discharge of silage through the bottom of the silo.

5 Claims, 3 Drawing Figures

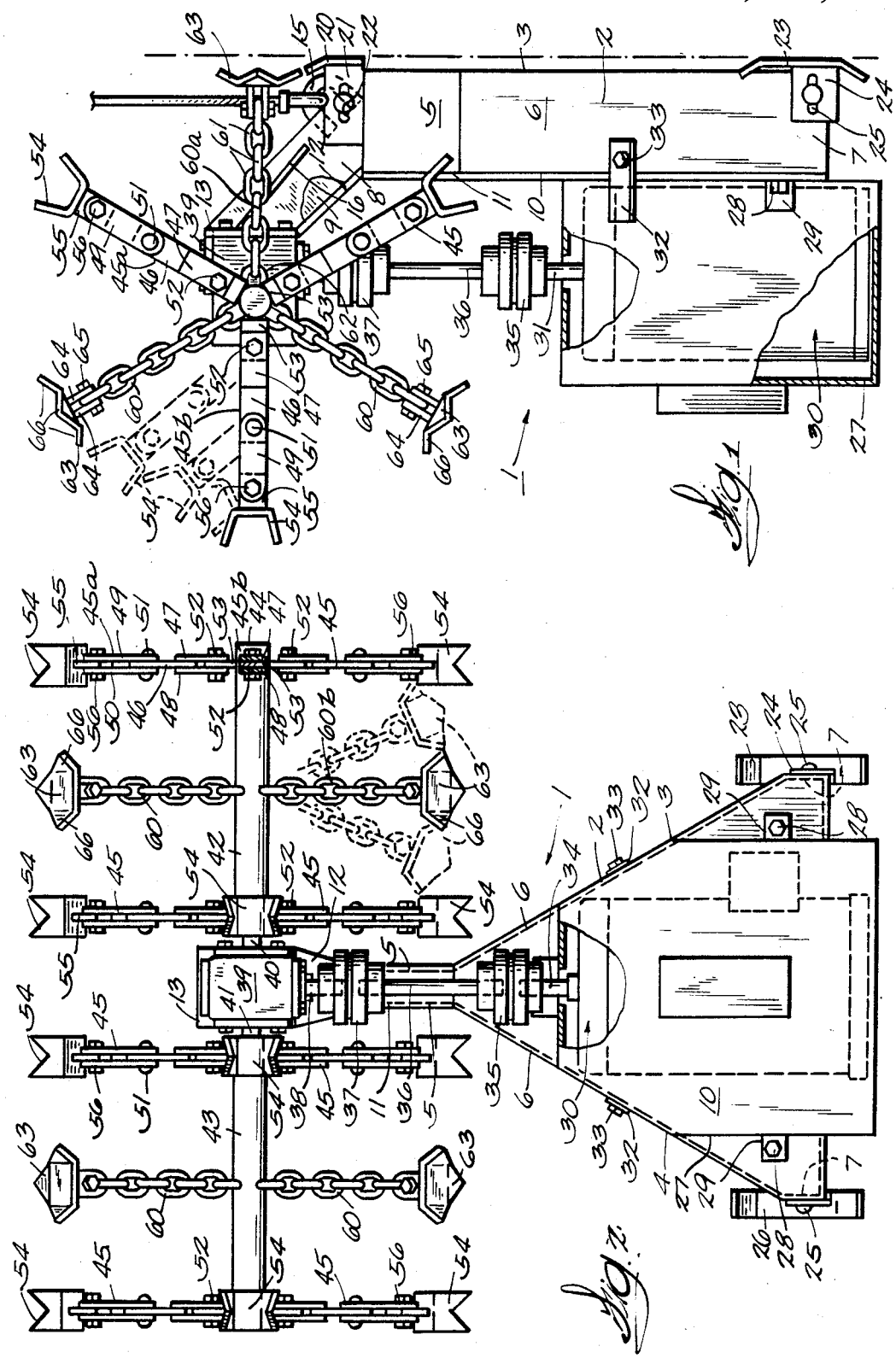

SILAGE-TUNNELING APPARATUS

This application is a continuation of application Ser. No. 421,747, filed Sept. 23, 1982, now abandoned.

TECHNICAL FIELD

This invention relates generally to agricultural equipment, more particularly apparatus designed to form a vertical tunnel through silage stored in a silo.

BACKGROUND ART

Various grain crops, for example corn, are stored in a silo until needed for feeding livestock. The usual method for removing a portion of the silage from a silo is to employ a silo unloading apparatus which operates to dislodge the upper layer of silage and move it to the outer wall of the silo where it is discharged through an open door in the side of the silo and then transferred to a conveyor or other means for supplying the animals to be fed.

Some silo unloaders include means for forming a cylindrical channel along the center of the mass of silage as the silo is being filled. See for example U.S. Pat. Nos. 3,794,190, 3,075,657, 3,908,840 and 3,368,703. The central channel was intended to provide a discharge channel for removal of silage through the bottom of the silo. However, this system has not proved to be effective and finds little use today.

Other proposals include various means for forming a vertical channel within the silage extending along the inside surface of the wall of the silo. One of these devices is a cylindrical torpedo that is winched up along the wall while the silo is being filled. Torpedoes are used only slightly because it is difficult to accurately determine the position of a torpedo relative to silage being loaded into a silo and it tends to move sideways as it is winched upwards. Another proposal, see U.S. Pat. No. 3,063,585, involves using an electric drill having radial blades mounted for rotation about a vertical shaft through silage upward along a track secured to the inside of the wall of a silo after it had been filled. This device, however, does not present a useful solution because of the difficulty of tunneling through silage that has become firmly packed into a relatively hardened mass of material.

A principal object of the present invention is to provide a silage-tunneling apparatus that is capable of forming a vertical tunnel in silage packed within a silo. Another is to provide a silage-tunneling apparatus that does not require the addition of a vertical track to the interior surface of the wall of the silo. A further main object is to provide a silage-tunneling apparatus which can be operated at sufficiently low speed when driven with an electric motor to develop the power necessary to form a vertical tunnel in silage firmly packed within a silo. Other objects will become apparent from the following detailed description of this invention.

DISCLOSURE OF THE INVENTION

The new silage-tunneling apparatus of this invention comprises a skid on which is mounted an electric motor arranged to rotate a drive shaft that is positioned horizontally. Cutter arms are connected to the drive shaft so as to be rotated upon actuation of the motor. The cutter arms include inner and outer hinged rigid arms between which are disposed flexible chain arms. Silage cutting means are attached to the outer ends of each of the cutter arms. The apparatus is winches upwardly along the inside surface of the wall of a silo to form a vertical tunnel through the silage that acts as a discharge chute for conveying silage dislodged by a silo unloader downwardly and out through the bottom of the silo.

BRIEF DESCRIPTION OF THE DRAWINGS

The silage-tunneling apparatus herein disclosed is fully described below in accordance with the requirements of 35 U.S.C. §112 by reference to the following drawings, in which:

FIG. 1 is a side view of a silage-tunneling apparatus according to the present invention;

FIG. 2 is a plan view of the apparatus of FIG. 1; and

BEST MODE FOR CARRYING OUT THE INVENTION

Figure 3:
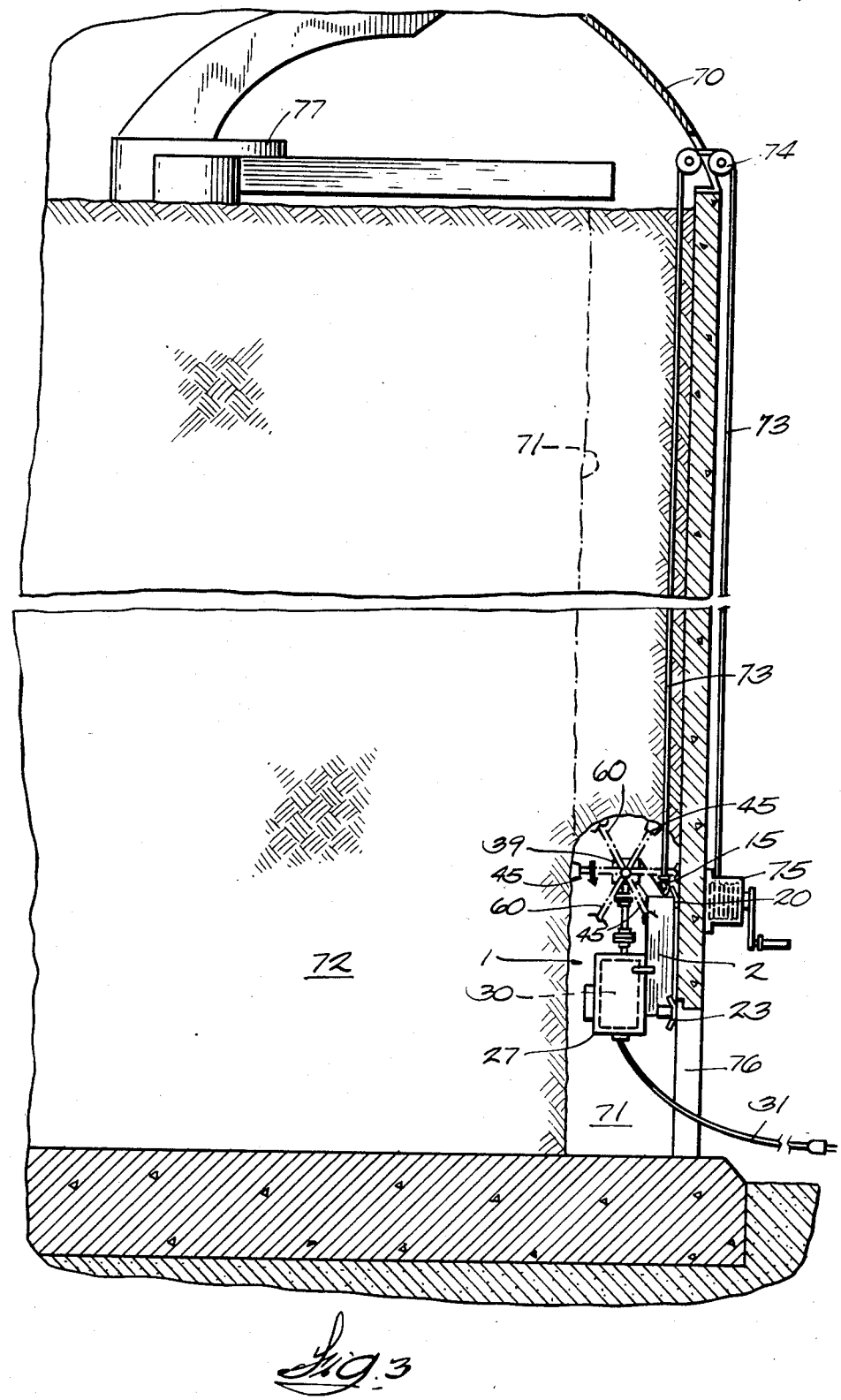
FIG. 3 is a sectional view, with portions broken away, illustrating the silage-tunneling apparatus of FIGS. 1 and 2 installed in a silo.

FIGS. 1–3 illustrate a silage-tunneling apparatus 1 constructed according to the present invention.

The silage-tunneling apparatus 1 includes a skid 2 that is constructed of a pair of spaced side members 3 and 4 each consisting of a front panel 5, angled panel 6 and rear panel 7. An upstanding support element 8 is welded to the inner face of front panel 5 of the side member 3, and a similar support element 9 is welded to the inner face of the front panel 5 of the side member 4.

The side members 3 and 4 are arranged with their front panels 5 slightly spaced from one another and angled panels 6 diverging from one another as shown in the drawings. A main base plate 10 is welded to the top edges of the angled panels 6 and rear panels 7 of the side members, an intermediate base plate 11 is welded to the top edges of the spaced front panels 5 of each side member, plate 12 is welded to spaced side edges of the support elements 8 and 9, and a mounting plate 13 is welded to the spaced top edges of the support elements 8 and 9. This construction provides a rigid skid assembly on which the various operating elements of the silage-tunneling apparatus 1 are mounted.

The support elements 8 and 9 are spaced from one another when the skid is assembled as described above, and a towing link 15 is welded in place between the two support elements. The mounting plate 13 extends beyond the sides of the spaced support elements 8 and 9; a gusset plate 16 may be welded to each support element and to the underside of the portion of the mounting plate that extends beyond the support elements so as to provide additional support for the mounting plate.

Referring now to FIG. 1, a front slide 20 having an upturned leading edge is welded to a plate 21 that is bolted to support element 8, the plate 21 preferably including a slot 22 through which the attachment bolt passes so as to permit limited perpendicular movement of the slide relative to the skid. A rear slide 23 having upturned leading and trailing edges is welded to plate 24 that is bolted to the rear panel 7 of the side member 3; the plate 24 has a slot 25 through which the attachment bolt passes so as to allow limited perpendicular travel of the slide relative to the skid. A rear slide 26 is similarly attached to the side member 4 (see FIG. 2).

An electric motor 30 is attached to the main base plate 10, such as by bolts not shown. The motor 30 may be a 110 or 220 volt AC motor and includes a power cord 31 (see FIG. 3) for connection to a suitable source of power. The motor includes an output shaft 34 that is connected through coupling 35 to an intermediate shaft 36 that is connected by a coupling 37 to the input shaft 38 of a speed reduction gear box 39. The gear box 39 is attached, such as by bolts, to the mounting plate 13 of the skid 2.

The motor 30 is covered by a shroud 27 to reduce fouling of the motor by silage. The shroud 27 is secured to the main base plate 10 by bolts 28 extending through the lower leg of L-shaped tabs 29 attached to the shroud. The shroud also is secured to the side members 3 and 4 by means of plates 32 welded to the shroud and bolted to the side members by bolts 33.

The gear box 39 has two output shafts 40 and 41 extending at right angles to the input shaft 38. A first drive shaft 42 is secured to output shaft 40 and a second drive shaft 43 is secured to output shaft 41, the two drive shafts being connected to their respective output shafts with a key and set screws. The first and second drive shafts 42 and 43 combine to form a drive shaft 44 having its axis arranged horizontally that will be used to rotate the various cutter arms of the silage-tunneling apparatus 1. A set of three cutter arms 45 is attached near the outer end of the first drive shaft 42 remote from the skid, and a similar set of three cutter arms 45 is attached near the inner end of the drive shaft 42 adjacent the skid. Also, a set of three cutter arms 45 is secured to the second drive shaft 43 remote from the skid and a set of three cutter arms 45 is secured to the drive shaft 43 adjacent the skid. The cutter arms 45 in each set of three are arranged approximately 120° apart.

Each cutter arm 45 is of the same construction, and the following detailed description is made with reference to the arms 45 secured near the outer end of first drive shaft 42, particularly arms 45a and 45b.

Each cutter arm 45 (see arm 45a in FIG. 1) comprises a center bar link 46, a pair of spaced inner bar links 47 and 48 welded to the center bar link, and a pair of spaced outer bar links 49 and 50 hinged to the center bar link by means of rivet 51. The inner bar links 47 and 48 are hinged about bolt 52 to plate 53 welded to the drive shaft 42; arm 45b is broken away in FIG. 2 to show this connection. A cutting means 54, illustrated herein as a U-shaped element, includes an extension 55 that is positioned between the outer bar links 49 and 50 and hingedly connected therebetween by bolt 56 extending through the two links.

Each cutter arm 45 as thusly described is an arm that is rigid in the axial direction of the drive shaft 44 but hinged or pivotable in the radial direction. As illustrated by the dotted line positions of arm 45b in FIG. 1, the cutting means 54 at the outer extremity of the arm 45 can hinge about the bolt 56, the outer bar links 49 and 50 can hinge about the rivet 51, and the inner bar links 47 and 48 can hinge or pivot about the bolt 52. The purpose of this hinged arm construction is to enable an arm 45 and one or more elements of the arm 45 to hinge or pivot when an obstruction is encountered during the silage-tunneling operation, such as a hardened mass of silage, frozen section of silage, rock, etc. At the same time, the arms 45 are rigid in the axial direction, speaking with reference to the drive shaft, so that they can carve a tunnel in the silage having a uniform width sufficient to provide clearance for the tunneling apparatus to ascend through a mass of silage.

A set of three intermediate cutter arms 60 is attached to the first drive shaft 42 between the two sets of cutter arms 45 attached thereto, and a similar set of intermediate cutter arms 60 is attached to the second drive shaft 43 between the arms 45 secured thereto. As indicated in FIG. 1, the arms 60 in each set are also positioned about 120° from one another, and the arms 60 are preferably arranged intermediate the arms 45 viewed along the axis of the drive shaft 44. Each cutter arm 60 is formed of a series of chain links 61 (see arm 60a in FIG. 1), with the innermost chain link 61 secured to a chain loop 62 welded to the drive shaft 42. A cutting means 63 is attached to the outer end of each intermediate arm 60 and includes a pair of spaced tabs 64 through which a bolt 65 extends to connect the cutting means 63 to the outermost link 61 of an arm 60. The cutting means 63 is illustrated as a rectangular shaped element having upturned tooth portions 66.

As indicated in the drawings, the intermediate cutter arms 60 are flexible arms. They are flexible in the radial direction relevent to the drive shaft 44, and they also may swing from side to side as shown by the dotted line positions of the arm 60b in FIG. 2. The flexible intermediate cutter arms 60 are thus able to rake out silage in the zone between the two sets of spaced cutter arms 45 secured to each portion of the drive shaft 44.

OPERATION

FIG. 3 illustrates a silage-tunneling apparatus 1 of the present invention installed in a silo 70 and being used to form a vertical tunnel 71 in silage 72. Before the silo is filled, the farmer places a cable 73 along the inner surface of the wall of the silo and strings it upwardly over sheaves 74 and out of the silo, then down the outside of the silo to a winch 75. A collapsible form or bales of hay or straw can be placed over the bottom two doors of the silo to create a recess large enough to receive the silage-tunneling apparatus, after which the silo is filled. Also, however, the silo can be filled without using a form or bales of hay or straw in this fashion.

When it is desired to start feeding, doors covering the opening 76 at the bottom of the silo are removed. If a collapsible form or bales of hay or straw were used as described above, they are removed and the silage-tunneling apparatus 1 is inserted into the recess formed thereby; if neither was used during filling, silage behind the opening is dug out to form an area large enough to put the apparatus 1 inside the silo. The lower end of the cable 73 inside the silo is then attached to the towing link 15 of the apparatus. The power cord 31 of the apparatus is plugged into a suitable electrical outlet to rotate the drive shaft 44. The apparatus is most effectively arranged relative to the inner surface of the wall of the silo such that the direction of rotation of the cutter arms 45 and 60 about the drive shaft 44 is away from the wall during the upper half of their rotary motion; thus the arms rotate counterclockwise when the juxtaposition of the apparatus and silo wall is as illustrated in FIG. 3, as shown by the arrow. This arrangement is useful since the reaction forces developed during operation will push the skid against the inner surface of the wall so that the apparatus will travel upwardly along the wall and also because the cutter arms will throw silage away from the apparatus and thereby reduce fouling of its elements such as the motor. The winch 75 is used to pull the tunneling apparatus 1 upwardly through the silage 72 along the inner surface of the wall of the silo. The apparatus 1 is slowly pulled up through the silage in this fashion. During the initial portion of this operation, silage which is removed to form the tunnel 71 is delivered through the lower opening 76 and used for feed as necessary. Use of the silage-tunneling apparatus 1 is continued in this manner to provide silage for feed delivery until it has formed the tunnel 71 extending all the way to the top of the silage alongside the inner surface of the wall of the silo. The apparatus 1 is lowered back down the tunnel 71 by reversing rotation of the winch 75 and then removed from the silo. Thereafter, silage for feed is delivered through the tunnel 71 by means of silo unloader 77 positioned inside the silo at the top of the silage. (In event a silo has been filled before a cable 73 was positioned as described above, a rod can be driven down through the silage along the inside wall of the silo and a cable attached to the rod and pulled back up through the opening thusly formed.)

The silage-tunneling apparatus 1 rides up the inner surface of the wall of the silo along the slides 20 and 23 attached to the skid of the apparatus. No track needs to be attached inside the silo for proper operation of the tunneling apparatus 1. Also, the combination of an electric motor 30 and speed reduction gear box 39 enables rotation of the various cutter arms at a relatively slow speed and provides enough torque or power to cut through hardened silage. The hinged cutter arms 45 of the apparatus 1 function to carve out the boundaries of the tunnel through the silage and the flexible intermediate cutter arms 60 operate to clean or rake out the silage between the arms 45 within the tunnel. It has been found that a clean vertical tunnel can be formed using the apparatus of the present invention in both loose silage and hardened silage. Also, the feature of the horizontal drive shaft 44 of the apparatus 1 provides a more effective tunneling operation than would be possible with a vertical drive shaft. I have found that a 1 horsepower electric motor 30 operating at 1725 rpm coupled to a 5:1 speed reduction gear box 39 to rotate the drive shaft 44 at 345 rpm provides an effective silage-tunneling apparatus. The apparatus thusly described therefore provides a useful agricultural implement capable of obviating the disadvantages of presently known machines intended for the same purpose.

Although this invention has been described hereinabove by reference to a specific embodiment, it is anticipated that those of ordinary skill in the design of agricultural equipment will be able to devise changes to the described embodiment and other versions thereof that will remain within the true spirit and scope of this invention as set forth in the appended claims.

I claim:

1. Silage-tunneling apparatus adapted to cut through silage stored in a silo upon movement of the apparatus upwardly along the inside surface of the wall of the silo and thereby form a vertical tunnel extending through the silage to provide an opening for the discharge of silage through the bottom of the silo, said silage-tunneling apparatus comprising, in combination:
(1) a skid forming a base for the apparatus;
(2) a motor and drive transfer means mounted on the skid;
(3) a horizontal drive shaft driven by the motor and said drive transfer means, the drive shaft having a first portion extending from said drive transfer means on one side of the skid and a second portion extending from said drive transfer means on a side opposite said one side of the skid;
(4) inner and outer hinged rigid cutter arms secured to each of the first and second portions of the drive shaft and extending radially therefrom,
each inner and outer cutter arm including at least one hinged section adapted to enable the arm to hinge radially upon contact with an obstruction, and having an inner end secured to the drive shaft and an outer end;
(5) at least one intermediate flexible cutter arm secured to each of the first and second portions of the drive shaft between the inner and outer hinged rigid cutter arms thereon,
each intermediate cutter arm being a flexible arm consisting of a plurality of chain links secured to one another, and having an inner end secured to the drive shaft and an outer end; and
(6) silage cutting means attached to the outer end of the inner and outer rigid cutter arms and flexible cutter arms.

2. Silage-tunneling apparatus according to claim 1, wherein:
the hinged rigid and flexible cutter arms are each arranged in sets of three attached to the drive shaft.

3. Silage-tunneling apparatus according to claim 1, wherein:
slides are attached to the skid for engagement with the inside surface of the wall of the silo, the slides having limited movement relative to the skid.

4. Silage-tunneling apparatus according to claim 1, wherein:
said motor is an electric motor and said drive transfer means comprises through a speed reduction gear box.

5. Silage-tunneling apparatus according to claim 1, wherein:
the inner and outer hinged rigid cutter arms each consists of a plurality of bar links hingedly connected together.

* * * * *